(12) United States Patent
Nakaso

(10) Patent No.: US 11,068,198 B2
(45) Date of Patent: Jul. 20, 2021

(54) DATA VERIFICATION APPARATUS

(71) Applicant: SUBARU CORPORATION, Tokyo (JP)

(72) Inventor: Yoshiaki Nakaso, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 115 days.

(21) Appl. No.: 16/596,561

(22) Filed: Oct. 8, 2019

(65) Prior Publication Data
US 2020/0210095 A1    Jul. 2, 2020

(30) Foreign Application Priority Data

Dec. 26, 2018 (JP) .............................. JP2018-242136

(51) Int. Cl.
*G06F 12/00* (2006.01)
*G06F 3/06* (2006.01)
*G06F 11/20* (2006.01)
*G06F 11/16* (2006.01)

(52) U.S. Cl.
CPC .......... *G06F 3/0653* (2013.01); *G06F 3/0619* (2013.01); *G06F 3/0646* (2013.01); *G06F 3/0659* (2013.01); *G06F 3/0673* (2013.01); *G06F 11/1662* (2013.01); *G06F 11/2056* (2013.01)

(58) Field of Classification Search
CPC .... G06F 3/0653; G06F 3/0619; G06F 3/0659; G06F 3/0673; G06F 3/0646; G06F 11/2056; G06F 11/1662
See application file for complete search history.

(56) References Cited

U.S. PATENT DOCUMENTS

| | | | | |
|---|---|---|---|---|
| 10,866,742 B1* | 12/2020 | Patterson | ............... | G06F 3/067 |
| 2004/0010467 A1* | 1/2004 | Hori | ...................... | H04L 9/0825 |
| | | | | 705/50 |
| 2008/0280602 A1 | 11/2008 | Ban | | |
| 2010/0017573 A1* | 1/2010 | Shinozaki | .......... | G06F 11/2094 |
| | | | | 711/162 |

FOREIGN PATENT DOCUMENTS

JP    2008-276663 A    11/2008

* cited by examiner

*Primary Examiner* — Shawn X Gu
(74) *Attorney, Agent, or Firm* — McGinn IP Law Group, PLLC

(57) ABSTRACT

A data verification apparatus includes a storage, a management unit, and a verification unit. The storage includes a first storage and a second storage. The first storage stores first data and first status information. The second storage stores second data and second status information. The management unit controls a write process and updates the first status information and the second status information in response to the write process, the write process being a process of writing the first data to the first storage on a basis of data acquired by communication with an external apparatus, and thereafter writing the second data to the second storage on a basis of the data. The verification unit verifies, in a state in which the communication is disconnected, the first data and the second data on a basis of the first status information and the second status information.

9 Claims, 10 Drawing Sheets

| UPDATE DATA SECTION SECU | | DETERMINATION | CORRESPONDING EXAMPLE |
|---|---|---|---|
| UPDATE STATUS STU | CERTIFICATE DATA DTU | | |
| UNDEFINED | WITH OR WITHOUT DATA ERROR | DETERMINE THAT COMPONENT MALFUNCTION OR DATA TAMPERING HAS OCCURRED. | SECTION MANAGEMENT UNIT 22 SETS DATA STATUS STD TO "TAMPERED WITH", THEREBY LOCKING VEHICLE 10. DISPLAY 13 DISPLAYS THAT COMPONENT MALFUNCTION OR DATA TAMPERING HAS OCCURRED. |
| BEING REWRITTEN | WITH DATA ERROR | DETERMINE THAT WRITE ERROR HAS OCCURRED DURING DATA WRITING TO UPDATE DATA SECTION SECU. | SECTION MANAGEMENT UNIT 22 SETS DATA STATUS STD TO "TO BE UPDATED". DISPLAY 13 DISPLAYS THAT WRITE ERROR HAS OCCURRED. SECTION MANAGEMENT UNIT 22 DELETES DATA OF UPDATE DATA SECTION SECU OR RE-UPDATES CERTIFICATE DATA DT BY COMMUNICATION WITH CHARGING STATION 30. |
| UPDATING | WITH DATA ERROR | DETERMINE THAT COMPONENT MALFUNCTION OR DATA TAMPERING HAS OCCURRED. | SECTION MANAGEMENT UNIT 22 SETS DATA STATUS STD TO "TAMPERED WITH", THEREBY LOCKING VEHICLE 10. DISPLAY 13 DISPLAYS THAT COMPONENT MALFUNCTION OR DATA TAMPERING HAS OCCURRED. |
| UNASSIGNED | WITH DATA ERROR | DETERMINE THAT THERE IS NO PROBLEM. | SECTION MANAGEMENT UNIT 22 DELETES CERTIFICATE DATA DTU. SECTION MANAGEMENT UNIT 22 RE-UPDATES CERTIFICATE DATA DT BY COMMUNICATION WITH CHARGING STATION 30. |

FIG. 6A

| UPDATE DATA SECTION SECU | | DETERMINATION | CORRESPONDING EXAMPLE |
|---|---|---|---|
| UPDATE STATUS STU | CERTIFICATE DATA DTU | | |
| BEING REWRITTEN | WITHOUT DATA ERROR | DETERMINE THAT WRITE ERROR HAS OCCURRED DURING DATA WRITING TO UPDATE DATA SECTION SECU. | SECTION MANAGEMENT UNIT 22 SETS DATA STATUS STD TO "TO BE UPDATED". DISPLAY 13 DISPLAYS THAT WRITE ERROR HAS OCCURRED. SECTION MANAGEMENT UNIT 22 DELETES DATA OF UPDATE DATA SECTION SECU OR RE-UPDATES CERTIFICATE DATA DT BY COMMUNICATION WITH CHARGING STATION 30. |
| UPDATING | WITHOUT DATA ERROR | DETERMINE THAT WRITE ERROR HAS OCCURRED IN UPDATING DATA OF DATA SECTION SECD ON BASIS OF UPDATE DATA SECTION SECU. | SECTION MANAGEMENT UNIT 22 PERFORMS UPDATING, I.E., UPDATING DATA OF DATA SECTION SECD ON BASIS OF UPDATE DATA SECTION SECU. |
| UNASSIGNED | WITHOUT DATA ERROR | DETERMINE THAT THERE IS NO PROBLEM. | SECTION MANAGEMENT UNIT 22 DELETES CERTIFICATE DATA DTU. |

FIG. 6B

| DATA SECTION SECD | | DETERMINATION | CORRESPONDING EXAMPLE |
|---|---|---|---|
| DATA STATUS STD | CERTIFICATE DATA DTD | | |
| NORMAL | WITH DATA ERROR | DETERMINE THAT WRITE ERROR HAS OCCURRED. | SECTION MANAGEMENT UNIT 22 MAKES CERTIFICATE DATA DTD UNAVAILABLE. DISPLAY 13 DISPLAYS THAT WRITE ERROR HAS OCCURRED. IN CASE WHERE CERTIFICATE DATA DTU OF UPDATE DATA SECTION SECU INCLUDES NO DATA ERROR, SECTION MANAGEMENT UNIT 22 PERFORMS UPDATING, I.E., UPDATING DATA OF DATA SECTION SECD ON BASIS OF UPDATE DATA SECTION SECU. |
| TO BE UPDATED | WITH DATA ERROR | DETERMINE THAT WRITE ERROR HAS OCCURRED IN UPDATING DATA OF DATA SECTION SECD ON BASIS OF UPDATE DATA SECTION SECU. | DISPLAY 13 DISPLAYS THAT WRITE ERROR HAS OCCURRED. SECTION MANAGEMENT UNIT 22 RE-UPDATES CERTIFICATE DATA DT BY COMMUNICATION WITH CHARGING STATION 30. IN CASE WHERE CERTIFICATE DATA DTU OF UPDATE DATA SECTION SECU INCLUDES NO DATA ERROR AND UPDATE STATUS STU IS "UPDATING", SECTION MANAGEMENT UNIT 22 PERFORMS UPDATING, I.E., UPDATING DATA OF DATA SECTION SECD ON BASIS OF UPDATE DATA SECTION SECU. |
| TAMPERED WITH | WITH DATA ERROR | DETERMINE THAT COMPONENT MALFUNCTION OR DATA TAMPERING HAS OCCURRED. | DISPLAY 13 DISPLAYS THAT COMPONENT MALFUNCTION OR DATA TAMPERING HAS OCCURRED. |

FIG. 7A

| DATA SECTION SECD | | DETERMINATION | CORRESPONDING EXAMPLE |
|---|---|---|---|
| DATA STATUS STD | CERTIFICATE DATA DTD | | |
| NORMAL | WITHOUT DATA ERROR | DETERMINE THAT THERE IS NO PROBLEM. | CERTIFICATE DATA DTD IS AVAILABLE |
| TO BE UPDATED | WITHOUT DATA ERROR | DETERMINE THAT WRITE ERROR HAS OCCURRED IN UPDATING DATA OF DATA SECTION SECD ON BASIS OF UPDATE DATA SECTION SECU. | DISPLAY 13 DISPLAYS THAT WRITE ERROR HAS OCCURRED. SECTION MANAGEMENT UNIT 22 RE-UPDATES CERTIFICATE DATA DT BY COMMUNICATION WITH CHARGING STATION 30. IN CASE WHERE CERTIFICATE DATA DTU OF UPDATE DATA SECTION SECU INCLUDES NO DATA ERROR AND UPDATE STATUS STU IS "UPDATING", SECTION MANAGEMENT UNIT 22 PERFORMS UPDATING, I.E. UPDATING DATA OF DATA SECTION SECD ON BASIS OF UPDATE DATA SECTION SECU. |
| TAMPERED WITH | WITHOUT DATA ERROR | DETERMINE THAT COMPONENT MALFUNCTION OR DATA TAMPERING HAS OCCURRED. | DISPLAY 13 DISPLAYS THAT COMPONENT MALFUNCTION OR DATA TAMPERING HAS OCCURRED. |

FIG. 7B

DATA VERIFICATION APPARATUS

CROSS-REFERENCE TO RELATED APPLICATIONS

The present application claims priority from Japanese Patent Application No. 2018-242136 filed on Dec. 26, 2018, the entire contents of which are hereby incorporated by reference.

BACKGROUND

The technology relates to a data verification apparatus that verifies data.

Vehicles such as automobiles are often equipped with nonvolatile storage apparatuses. The storage apparatus stores various data to be used in the vehicle. For example, Japanese Unexamined Patent Application Publication No. 2008-276663 discloses a data rewrite system that generates a rewrite inhibit command in a case where a rewrite command to a storage apparatus is confirmed to be invalid.

SUMMARY

An aspect of the technology provides a data verification apparatus including a storage, a management unit, and a verification unit. The storage includes a first storage and a second storage, the first storage being configured to store first data and first status information, the second storage being configured to store second data and second status information. The management unit is configured to control a write process and update the first status information and the second status information in response to the write process, the write process being a process of writing the first data to the first storage on a basis of data acquired by communication with an external apparatus, and thereafter writing the second data to the second storage on a basis of the data. The verification unit is configured to verify, in a state in which the communication is disconnected, the first data and the second data on a basis of the first status information and the second status information.

An aspect of the technology provides a data verification apparatus including a storage and circuitry. The storage includes a first storage and a second storage, the first storage being configured to store first data and first status information, the second storage being configured to store second data and second status information. The circuitry is configured to control a write process and update the first status information and the second status information in response to the write process, the write process being a process of writing the first data to the first storage on a basis of data acquired by communication with an external apparatus, and thereafter writing the second data to the second storage on a basis of the data. The circuitry is also configured to verify, in a state in which the communication is disconnected, the first data and the second data on a basis of the first status information and the second status information.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 6A is a table illustrating an operation example of the vehicle illustrated in FIG. 1.

FIG. 6B is another table illustrating an operation example of the vehicle illustrated in FIG. 1.

FIG. 7A is another table illustrating an operation example of the vehicle illustrated in FIG. 1.

FIG. 7B is another table illustrating an operation example of the vehicle illustrated in FIG. 1.

DETAILED DESCRIPTION

Figure 1:
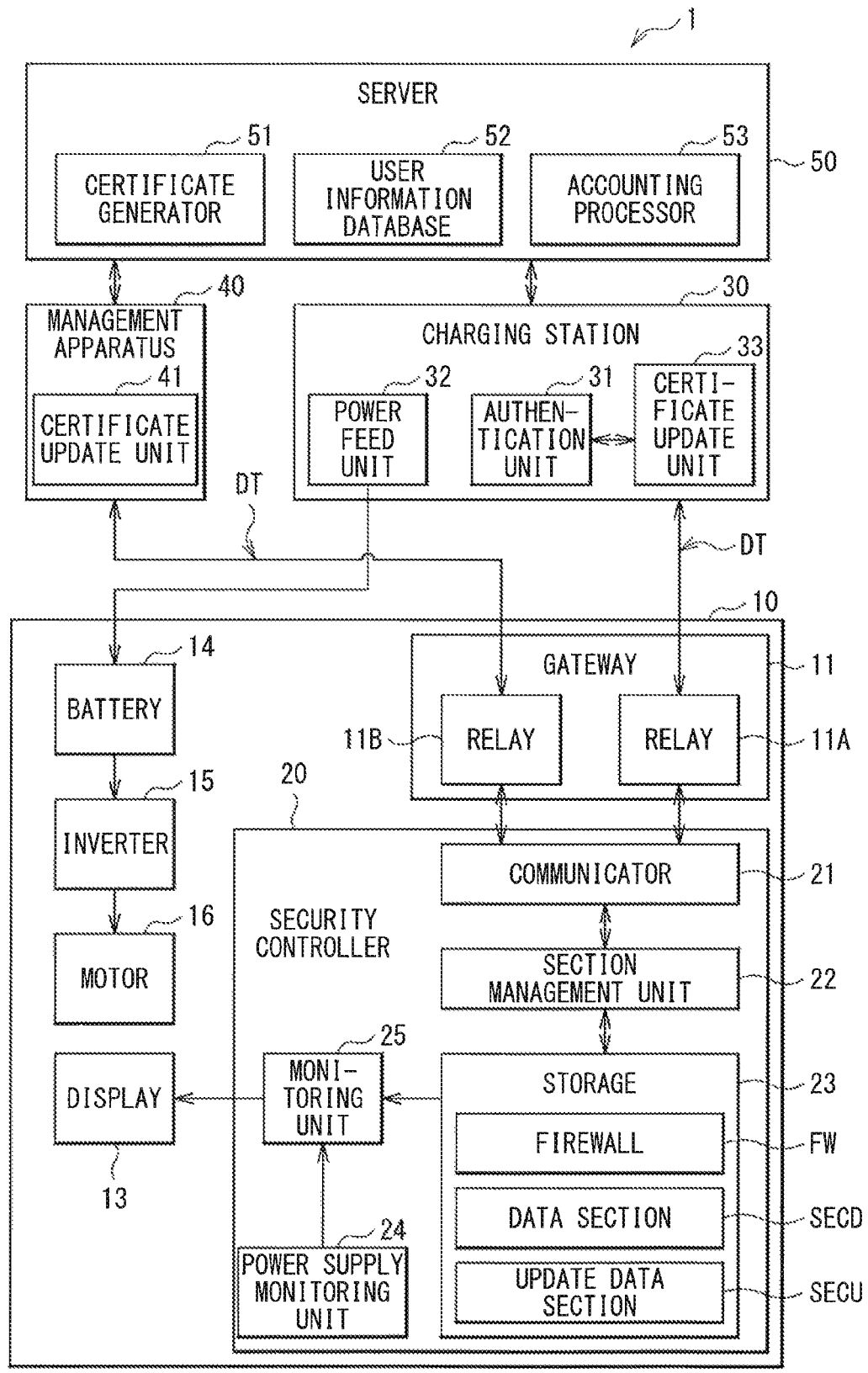
FIG. 1 is a block diagram illustrating a configuration example of a charging system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

It is generally desired that data stored in a storage apparatus have high reliability, and a further improvement in reliability is expected.

It is desirable to provide a data verification apparatus that makes it possible to improve reliability of data.

Example Embodiment

Configuration Example

FIG. 1 illustrates a configuration example of a charging system 1 to which a data verification apparatus according to an example embodiment is applicable. The charging system 1 may include a vehicle 10, a charging station 30, a management apparatus 40, and a server 50.

The vehicle 10 may be, for example, an electric vehicle. In a case of intending to charge a battery 14 of the vehicle 10, a driver (user) of the vehicle 10 may move the vehicle 10 to the charging station 30, and couple the vehicle 10 to the charging station 30 with a cable. The charging station 30 may communicate with the vehicle 10 via the cable, and perform authentication on the basis of certificate data DT stored in the vehicle 10. In a case where the authentication succeeds, the charging station 30 may supply electric power to the battery 14 of the vehicle 10. By using a user information database 52, the server 50 may specify information necessary for accounting, and perform the accounting on the user on the basis of the information. The information may correspond to a user identifier UID included in the certificate data DT. The battery 14, the user information database 52, and the user identifier UID will be described later.

The certificate data DT stored in the vehicle 10 may be updated at regular time intervals, for example. In this example, the vehicle 10 may acquire new certificate data DT from the charging station 30 by communicating with the charging station 30 via the cable, and update the certificate data DT stored in the vehicle 10 with the new certificate data DT. In updating the certificate data DT, a write error can occur in the vehicle 10, for example. In this case, it is possible for the vehicle 10 to re-update the certificate data DT by, for example, communicating with the charging station 30.

In some cases, a malfunction of a component of the vehicle 10, for example, can cause an error to occur in the certificate data DT. There is also a possibility that a malicious person tampers with the certificate data DT. The vehicle 10 may determine that a component malfunction or data tampering has occurred, on the basis of status information and the certificate data DT that are stored in the vehicle 10, and rewrite the status information. The status information may include a data status STD and an update status STU to be described later. In this case, the vehicle 10 may enter a locked state. The locked state may be a state in which the vehicle 10 is not supplied with electric power from the charging station 30, and does not update the certificate data DT upon communicating with the charging station 30. In such a case, the user may bring the vehicle 10 to a dealer, for example. In a case of a component malfunction, the dealer may replace the component. In addition, the management apparatus 40 managed by the dealer may communicate with the vehicle 10 to forcibly update the certificate data DT stored in the vehicle 10 and reset the status information. In a case of data tampering, the management apparatus 40 managed by the dealer may communicate with the vehicle 10 to forcibly update the certificate data DT stored in the vehicle 10 and reset the status information. Thus, even in a case where the vehicle 10 is in the locked state, it is possible for the management apparatus 40 to forcibly write certificate data DT to the vehicle 10, thereby unlocking the vehicle 10.

The vehicle 10 may include a gateway 11, a security controller 20, a display 13, the battery 14, an inverter 15, and a motor 16.

The gateway 11 may include relays 11A and 11B. The relay 11A may relay communication between the security controller 20 and the charging station 30. The security controller 20 and the charging station 30 may be coupled to each other with a cable, for example, to perform communication using Transport Layer Security (TLS). The relay 11B may relay communication between the security controller 20 and the management apparatus 40. The security controller 20 and the management apparatus 40 may be coupled to each other with a cable, for example, to perform security communication using a dedicated standard, for example.

The security controller 20 may include, for example, a security electronic control unit (ECU). The security ECU may include one or more semiconductor chips, for example. The security controller 20 may include a communicator 21, a section management unit 22, a storage 23, a power supply monitoring unit 24, and a monitoring unit 25.

In a case where the vehicle 10 is coupled to the charging station 30, the communicator 21 may communicate with the charging station 30 via the relay 11A of the gateway 11. In a case where the vehicle 10 is coupled to the management apparatus 40, the communicator 21 may communicate with the management apparatus 40 via the relay 11B of the gateway 11.

The section management unit 22 may manage a data section SECD and an update data section SECU of the storage 23, by managing a process of writing data to the storage 23 and a process of reading data from the storage 23.

The storage 23 may include, for example, a nonvolatile memory such as a flash memory. The storage 23 may include a firewall FW, the data section SECD, and the update data section SECU.

The firewall FW may monitor communication with the section management unit 22, and prevent undesired communication in order to protect data stored in the storage 23.

The data section SECD may be a memory region that stores various data to be used in the vehicle 10.

Figure 2:
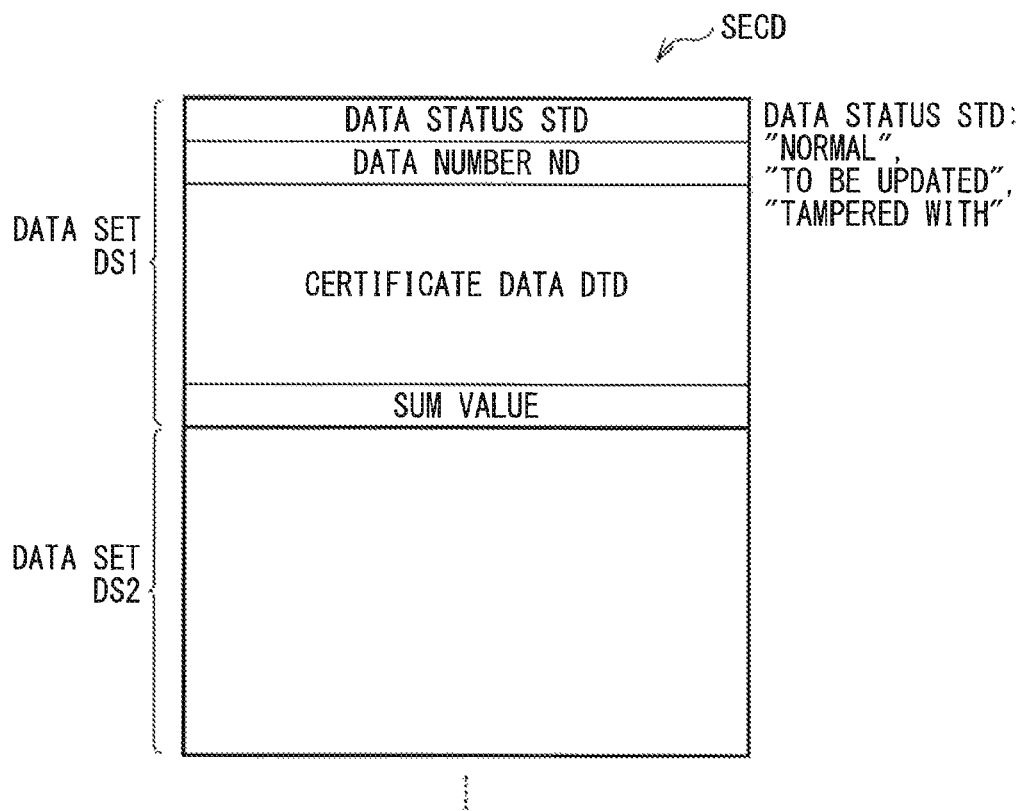
FIG. 2 is an explanatory diagram illustrating an example of a data section illustrated in FIG. 1.

FIG. 2 illustrates an example of the data section SECD. The data section SECD may store a plurality of data sets DS including data sets DS1, DS2, etc. Certificate data DT may be stored in any one of the data sets DS (in this example, a first data set DS1). The data set DS1 may include a data status STD, a data number ND, the certificate data DT (certificate data DTD), and a SUM value. For convenience of description, the certificate data DT stored in the data section SECD is also referred to as certificate data DTD.

The data status STD may include information about a status of the write process performed by the security controller 20. In this example, it is possible to set the data status STD to "normal", "to be updated", or "tampered with", for example, as will be described later.

The data number ND may be a number that identifies the data set DS1 among the data sets DS stored in the data section SECD. The data number ND may correspond to an address that indicates a memory region storing the data set DS1 in the data section SECD.

The certificate data DTD may be an encrypted digital certificate. The certificate data DTD may include information about, for example, an identifier (vehicle identifier VID) that enables the vehicle 10 to be identified or an identifier (user identifier UID) that enables the user to be identified.

The SUM value may be a code value of an error detecting code. In this example, the SUM value may be calculated on the basis of the data status STD, the data number ND, and the certificate data DTD included in the data set DS1. By using the SUM value, the security controller 20 is able to verify presence or absence of a data error in the data set DS1.

Although the SUM value is used in this example, what is used for verification is not limited. Instead of the SUM value, mirror data of the data status STD, the data number ND, and the certificate data DTD may be used, for example. In this case, the security controller 20 is able to detect a place of a data error, for example, in addition to presence or absence of a data error.

The update data section SECU (FIG. 1) may be a memory region that temporarily stores new certificate data DT to be stored in the data section SECD, for example, before updating the certificate data DT stored in the data section SECD. In other words, in updating the certificate data DT, the security controller 20 may first write certificate data DT to the update data section SECU, and thereafter write the certificate data DT to the data section SECD.

Figure 3:
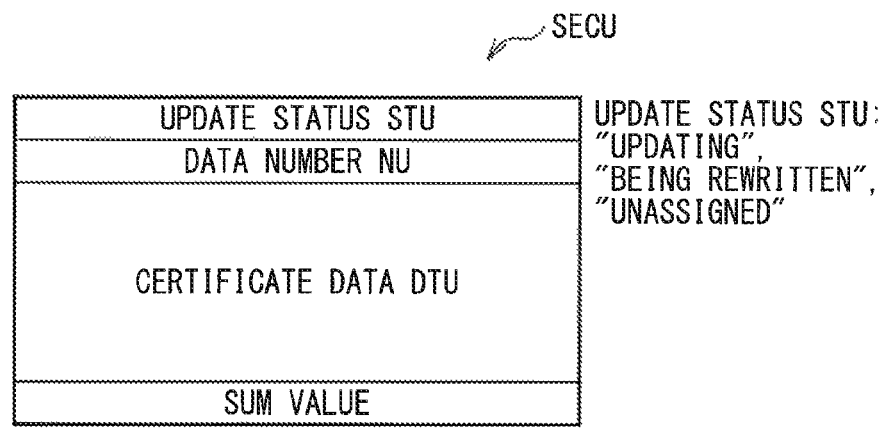
FIG. 3 is an explanatory diagram illustrating an example of an update data section illustrated in FIG. 1.

FIG. 3 illustrates an example of the update data section SECU. In this example, data stored in the update data section SECU may include an update status STU, a data number NU, certificate data DT (certificate data DTU), and a SUM value. For convenience of description, the certificate data DT stored in the update data section SECU is also referred to as certificate data DTU.

The update status STU may include information about a status of the write process performed by the security controller 20. In this example, it is possible to set the update status STU to "updating", "being rewritten", or "unassigned", for example, as will be described later.

The data number NU may be a data number ND of a data set in the data section SECD, to which data of the update data section SECU is to be written. The data set may be the data set DS1 in this example. In a case of storing the certificate data DT in a data set DS2 in the data section SECD, for example, the data number NU of the update data section SECU may be a data number ND included in the data set DS2.

The certificate data DTU may be an encrypted digital certificate to be written to the data section SECD as the certificate data DTD.

The SUM value may be a code value of an error detecting code. The SUM value may be calculated on the basis of the update status STU, the data number NU, and the certificate data DTU. By using the SUM value, the security controller 20 is able to verify presence or absence of a data error in data stored in the update data section SECU.

Although the SUM value is used in this example, what is used for verification is not limited. Instead of the SUM value, mirror data of the data status STU, the data number NU, and the certificate data DTU may be used, for example. In this case, the security controller 20 is able to detect a place of a data error, for example, in addition to presence or absence of a data error.

In the security controller 20 with this configuration, the section management unit 22 may read the certificate data DT (certificate data DTD) from the data section SECD of the storage 23 on the basis of, for example, a read request from the charging station 30. The communicator 21 may transmit the read certificate data DT to the charging station 30 via the relay 11A. In addition, for example, in a case where new certificate data DT for update that is transmitted from the charging station 30 is received, the section management unit 22 first writes the new certificate data DT to the update data section SECU as the certificate data DTU. Thereafter, the section management unit 22 writes the new certificate data DT to the data section SECD as the certificate data DTD. In addition, in response to the write process, the section management unit 22 writes the update status STU to the update data section SECU, and writes the data status STD to the data section SECD.

The power supply monitoring unit 24 may monitor a power supply voltage that is to be supplied to the security controller 20. In a case where electric power supply stops and thereafter recovers, the power supply monitoring unit 24 may supply, to the monitoring unit 25, information about the stop of the electric power supply.

The monitoring unit 25 may monitor the data stored in the storage 23. Each time the vehicle 10 starts up, for example, the monitoring unit 25 may check whether the write process performed by the security controller 20 has been interrupted, on the basis of the update status STU and the data status STD stored in the storage 23. In a case where the write process has been interrupted, the monitoring unit 25 may check at which stage the interruption has occurred, and determine whether a component malfunction or data tampering has occurred or a data write error has occurred. The determination may be made on the basis of a result of the check, and the certificate data DTU and the certificate data DTD stored in the storage 23. The monitoring unit 25 may also determine a cause of the interruption of the write process, on the basis of information supplied from the power supply monitoring unit 24.

The display 13 may be provided on, for example, an instrument panel, and may include a liquid crystal display, for example. The display 13 may notify the user of information about data tampering or a data write error, for example, on the basis of an instruction from the monitoring unit 25.

The battery 14 may store electric power, and supply direct current electric power to the inverter 15. The battery 14 may be able to store electric power supplied from the charging station 30. The inverter 15 may generate alternating current electric power on the basis of the direct current electric power supplied from the battery 14, and supply the generated alternating current electric power to the motor 16. The motor 16 may be a power source that generates mechanical energy on the basis of the alternating current electric power supplied from the inverter 15. The mechanical energy may serve as driving force. Accordingly, the vehicle 10 is able to travel on the basis of the driving force of the motor.

The charging station 30 (FIG. 1) may be able to supply electric power to the battery 14 of the vehicle 10. The charging station 30 may be managed by, for example, a business operator that conducts charging business. Although this example takes a charging station as an example, the example is not limitative. Instead of a charging station, an apparatus that is able to supply electric power to home by Vehicle to Home (V2H) may be used for example. The charging station 30 may include an authentication unit 31, a power feed unit 32, and a certificate update unit 33.

The authentication unit 31 may perform authentication, on the basis of the certificate data DT acquired from the vehicle 10. In one example, the authentication unit 31 may perform the authentication by making inquiry to the user information database 52 of the server 50, on the basis of the certificate data DT acquired from the vehicle 10. The user information database 52 will be described later.

In a case where the authentication performed by the authentication unit 31 succeeds, the power feed unit 32 may supply electric power to the battery 14 of the vehicle 10. The charging station 30 may supply, to the server 50, information about the user identifier UID included in the certificate data DT, and information about an amount of the electric power supplied to the battery 14.

The certificate update unit 33 may update the certificate data DT of the vehicle 10. In one example, the certificate update unit 33 may update the certificate data DT of the vehicle 10 by writing new certificate data DT generated and transmitted by the server 50 to the storage 23 of the vehicle 10.

The management apparatus 40 may be managed by, for example, a dealer. The management apparatus 40 may include a certificate update unit 41. Like the certificate update unit 33 of the charging station 30, the certificate update unit 41 may update the certificate data DT. The management apparatus 40 may forcibly write new certificate data DT to the storage 23 of the vehicle 10.

The server 50 may include a certificate generator 51, the user information database 52, and an accounting processor 53.

The certificate generator 51 may generate the certificate data DT of the vehicle 10, on the basis of a request from the charging station 30 or the management apparatus 40. The server 50 may transmit the certificate data DT generated by the certificate generator 51 to the charging station 30 or the management apparatus 40 that has made the request.

The user information database 52 may manage, for example, the vehicle identifier VID, the user identifier UID, and information that is necessary for accounting on the user corresponding to the user identifier UID, in association with one another. The information necessary for the accounting may be, for example, credit card information or bank account information.

The accounting processor 53 may perform the accounting on the basis of the information about the user identifier UID and the information about the amount of supplied electric power, which are transmitted from the charging station 30. In one example, by using the user information database 52, the accounting processor 53 may specify information that is necessary for accounting on the user corresponding to the user identifier UID, on the basis of the user identifier UID transmitted from the charging station 30. The accounting processor 53 may calculate an amount of money on the basis of the information about the amount of supplied electric power, which is transmitted from the charging station 30, and perform the accounting on the basis of the calculated amount of money and the specified information necessary for the accounting.

In one embodiment, the security controller 20 may serve as a "data verification apparatus". In one embodiment, the storage 23 may serve as a "storage". In one embodiment, the update data section SECU may serve as a "first storage". In one embodiment, the data section SECD may serve as a "second storage". In one embodiment, the section management unit 22 may serve as a "management unit". In one embodiment, the monitoring unit 25 may serve as a "verification unit".

Operations and Workings

Now, description will be given on operations and workings of the charging system 1 of the example embodiment.
(Outline of Overall Operation)

First, an outline of overall operation of the charging system 1 will be described with reference to FIG. 1. In a case of intending to charge the battery 14 of the vehicle 10, the driver (user) of the vehicle 10 may move the vehicle 10 to the charging station 30, and couple the vehicle 10 to the charging station 30 with a cable. By communicating with the vehicle 10 via the cable, the charging station 30 may read the certificate data DT (certificate data DTD) stored in the data section SECD of the storage 23. On the basis of the read certificate data DT, the authentication unit 31 of the charging station 30 may perform authentication by making inquiry to the user information database 52 of the server 50. In a case where the authentication succeeds, the power feed unit 32 may supply electric power to the battery 14 of the vehicle 10. The charging station 30 may transmit, to the server 50, information about the user identifier UID included in the certificate data DT, and information about an amount of the electric power supplied to the battery 14. The accounting processor 53 of the server 50 may perform accounting, on the basis of the information about the user identifier UID and the information about the amount of supplied electric power, by using the user information database 52.

In addition, the vehicle 10 may acquire new certificate data DT from the charging station 30 by communicating with the charging station 30 via the cable, and update the certificate data DT stored in the vehicle 10 with the new certificate data DT. The section management unit 22 may manage the data section SECD and the update data section SECU of the storage 23, by managing the process of writing data to the storage 23 and the process of reading data from the storage 23. The section management unit 22 may first write the acquired new certificate data DT to the update data section SECU as the certificate data DTU, and thereafter write the new certificate data DT to the data section SECD as the certificate data DTD. In addition, in response to the write process, the section management unit 22 may write the update status STU to the update data section SECU, and write the data status STD to the data section SECD.

The monitoring unit 25 may monitor the data stored in the storage 23 The display 13 may notify the user of information about data tampering or a data write error, for example, on the basis of an instruction from the monitoring unit 25.
(Update of Certificate Data DT)

Figure 4A:
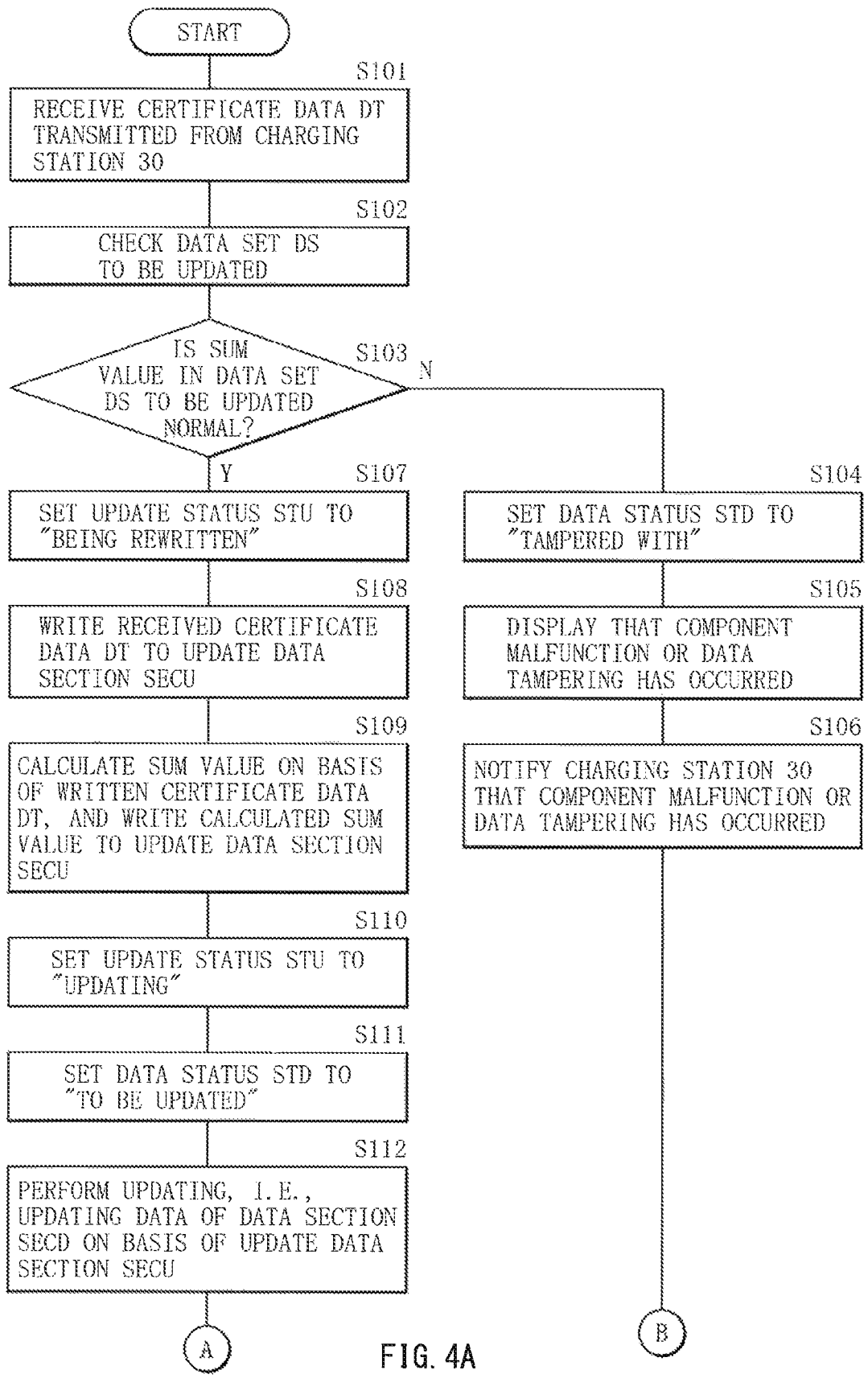
FIG. 4A is a flowchart illustrating an operation example of a vehicle illustrated in FIG. 1.
Figure 4B:
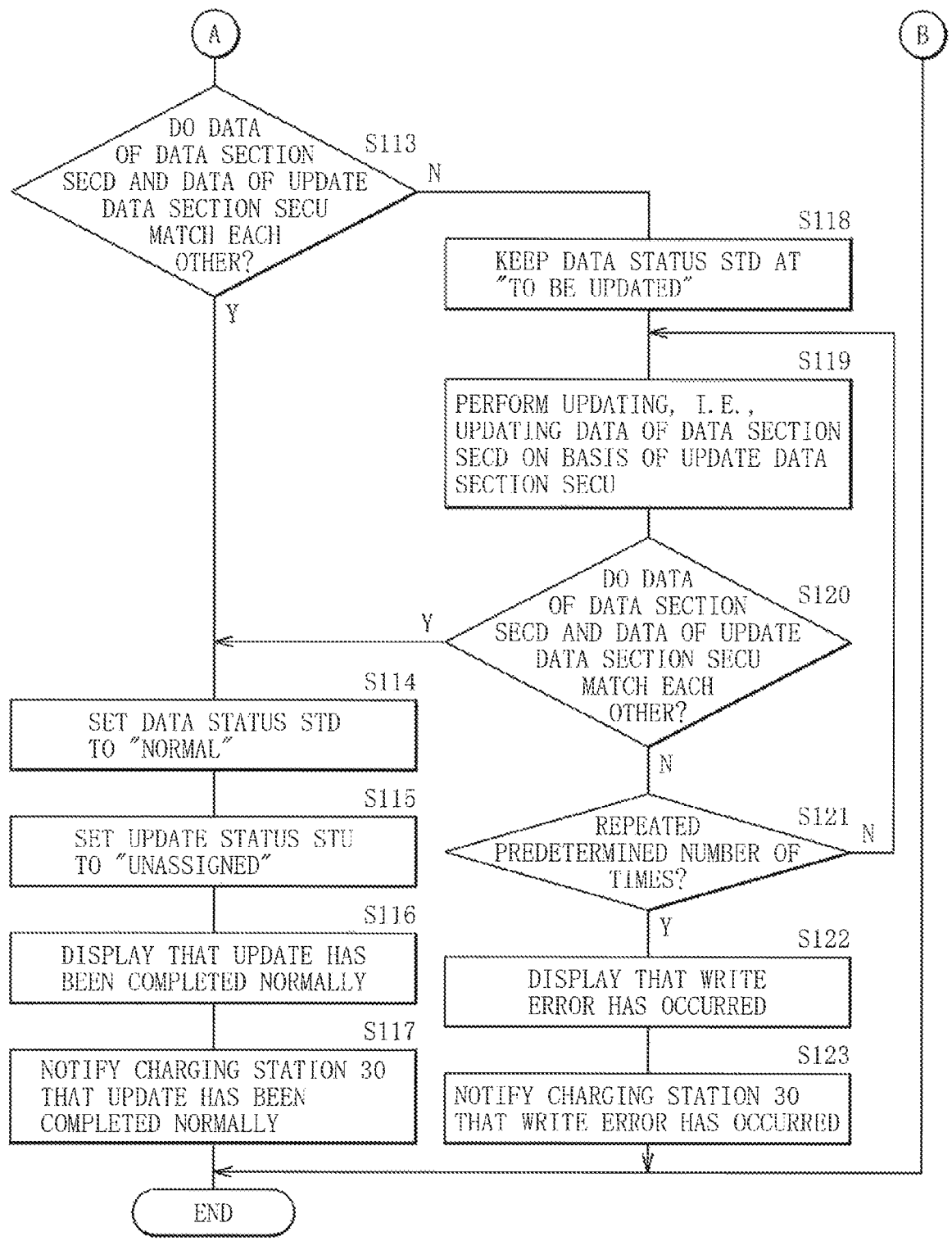
FIG. 4B is another flowchart illustrating an operation example of the vehicle illustrated in FIG. 1.

FIGS. 4A and 4B illustrate operation of the vehicle 10 in updating the certificate data DT. The section management unit 22 of the vehicle 10 may write new certificate data DT acquired from the charging station 30 to the update data section SECU as the certificate data DTU, and thereafter write the new certificate data DT to the data section SECD as the certificate data DTD. In addition, in response to the write process, the section management unit 22 may write the update status STU to the update data section SECU, and write the data status STD to the data section SECD. This operation is described in detail below.

First, the communicator 21 of the security controller 20 may receive new certificate data DT transmitted from the charging station 30 (step S101).

Thereafter, the section management unit 22 may check a data set DS to be updated in the data section SECD (step S102). In this example, certificate data DT (certificate data DTD) may be stored in the first data set DS1, as illustrated in FIG. 2. The section management unit 22 may therefore confirm that the data set DS to be updated is the first data set DS1.

Thereafter, the section management unit 22 may check whether the SUM value in the data set DS to be updated is normal (step S103). In this example, the section management unit 22 may calculate a SUM value on the basis of the data status STD, the data number ND, and the certificate data DTD included in the first data set DS1. In a case where the calculated SUM value matches the SUM value included in the data set DS1, the section management unit 22 may determine that the SUM value is normal.

In a case where the SUM value is abnormal in step S103 ("N" in step S103), the section management unit 22 may write a data status STD indicating "tampered with" to the data section SECD, thereby setting the data status STD to "tampered with" (step S104). In other words, in this case, a data error has occurred in the certificate data DT (certificate data DTD) in the data section SECD. Accordingly, the section management unit 22 may determine that it is likely that a component has malfunctioned or data has been tampered with, and set the data status STD to "tampered with".

The monitoring unit 25 may confirm that the data status STD is "tampered with", and the display 13 may display that a component malfunction or data tampering has occurred, on the basis of an instruction from the monitoring unit 25 (step S105).

The communicator 21 may notify the charging station 30 that a component malfunction or data tampering has occurred, on the basis of an instruction from the section management unit 22 (step S106).

In a case where the data status STD is "tampered with" as described above, the vehicle 10 may enter the locked state. Thereafter, the charging station 30 may be unable to update the certificate data DT of the vehicle 10, and may be unable to charge the battery 14 of the vehicle 10. In this case, the user may bring the vehicle 10 to a dealer, for example. In a case of a component malfunction, the dealer may replace the component. In addition, the management apparatus 40 may communicate with the vehicle 10 to update the certificate data DT stored in the vehicle 10 and reset the data status STD. In a case of data tampering, the management apparatus 40 managed by the dealer may communicate with the vehicle 10 to forcibly write certificate data DT to the vehicle 10 and reset the data status STD. In this manner, it is possible for the management apparatus 40 to unlock the vehicle 10.

In a case where the SUM value is normal in step S103 ("Y" in step S103), the section management unit 22 may write an update status STU indicating "being rewritten" to the update data section SECU, thereby setting the update status STU to "being rewritten" (step S107).

Thereafter, the section management unit 22 may write the new certificate data DT received by the communicator 21 in step S101 to the update data section SECU as the certificate data DTU (step S108).

Thereafter, the section management unit 22 may calculate a SUM value on the basis of the certificate data DTU written to the update data section SECU, and write the SUM value to the update data section SECU (step S109). In one example, it is possible for the section management unit 22 to read the certificate data DTU written to the update data section SECU in step S108, and calculate the SUM value on the basis of the read certificate data DTU. This example is not limitative. Alternatively, a buffer memory (not illustrated) may, for example, temporarily store the certificate data DT received by the communicator 21 in step S101. The section management unit 22 may calculate the SUM value on the basis of the certificate data DT stored in the buffer memory, and write the SUM value to the update data section SECU.

Thereafter, the section management unit 22 may write an update status STU indicating "updating" to the update data section SECU, thereby setting the update status STU to "updating" (step S110).

Thereafter, the section management unit 22 may write a data status STD indicating "to be updated", to the data section SECD, thereby setting the data status STD to "to be updated" (step S111).

Thereafter, the section management unit 22 may perform updating, i.e., updating data of the data section SECD on the basis of the update data section SECU (step S112). In one example, the section management unit 22 may read the data number NU and the certificate data DT (certificate data DTU) stored in the update data section SECU, and write the read certificate data DT, as the certificate data DTD, to a data set DS in the data section SECD. The data set DS may correspond to the read data number NU, and may be the first data set DS1 in this example. In addition, the section management unit 22 may read the SUM value stored in the update data section SECU, and write the read SUM value to the data set DS (in this example, the data set DS1).

Thereafter, the section management unit 22 may check whether the data of the data section SECD and the data of the update data section SECU match each other (step S113). In one example, the section management unit 22 may check whether the data number ND, the certificate data DTD, and the SUM value of the data set DS in the data section SECD and the data number NU, the certificate data DTU, and the SUM value of the update data section SECU respectively match each other. The data set DS may store the certificate data DT, and may be the first data set DS1 in this example.

In a case where the data of the data section SECD and the data of the update data section SECU match each other in step S113 ("Y" in step S113), the section management unit 22 may write a data status STD indicating "normal" to the data section SECD, thereby setting the data status STD to "normal" (step S114).

Thereafter, the section management unit 22 may write an update status STU indicating "unassigned" to the update data section SECU, thereby setting the update status STU to "unassigned" (step S115).

Thereafter, the monitoring unit 25 may confirm that the data status STD is "normal" and the update status STU is "unassigned", and the display 13 may display that the update of the certificate data DT has been completed normally, on the basis of an instruction from the monitoring unit 25 (step S116).

The communicator 21 may notify the charging station 30 that the update of the certificate data DT has been completed normally, on the basis of an instruction from the section management unit 22 (step S117).

In a case where the data of the data section SECD and the data of the update data section SECU do not match each other in step S113 ("N" in step S113), the section management unit 22 may keep the data status STD of the data section SECD at "to be updated" (step S118). Thereafter, as in step S112, the section management unit 22 may perform again the updating, i.e., updating the data of the data section SECD on the basis of the update data section SECU (step S119). Thereafter, as in step S113, the section management unit 22 may check whether the data of the data section SECD and the data of the update data section SECU match each other (step S120). In a case where the data of the data section SECD and the data of the update data section SECU match each other in step S120 ("Y" in step S120), the operation may go to step S114. In a case where the data of the data section SECD and the data of the update data section SECU do not match each other ("N" in step S120), steps S119 and S120 may be repeated a predetermined number of times.

In a case where the number of times of repetition reaches the predetermined number of times ("Y" in step S121), the monitoring unit 25 may confirm that the data status STD is "to be updated" and the update status STU is "updating", and the display 13 may display that a write error has occurred, on the basis of an instruction from the monitoring unit 25 (step S122).

The communicator 21 may notify the charging station 30 that a write error has occurred, on the basis of an instruction from the section management unit 22 (step S123).

This may be the end of this flow.

In one embodiment, the certificate data DTU may serve as "first data". In one embodiment, the update status STU may serve as "first status information". In one embodiment, "being rewritten" of the update status STU may serve as a "first status". In one embodiment, "updating" of the update status STU may serve as a "second status". In one embodiment, "unassigned" of the update status STU may serve as a "third status". In one embodiment, the certificate data DTD may serve as "second data". In one embodiment, the data status STD may serve as "second status information". In one embodiment, "tampered with" of the data status STD may serve as a "fourth status". In one embodiment, "to be updated" of the data status STD may serve as a "fifth status". In one embodiment, "normal" of the data status STD may serve as a "sixth status".

(Operation of Charging Battery 14)

Figure 5A:
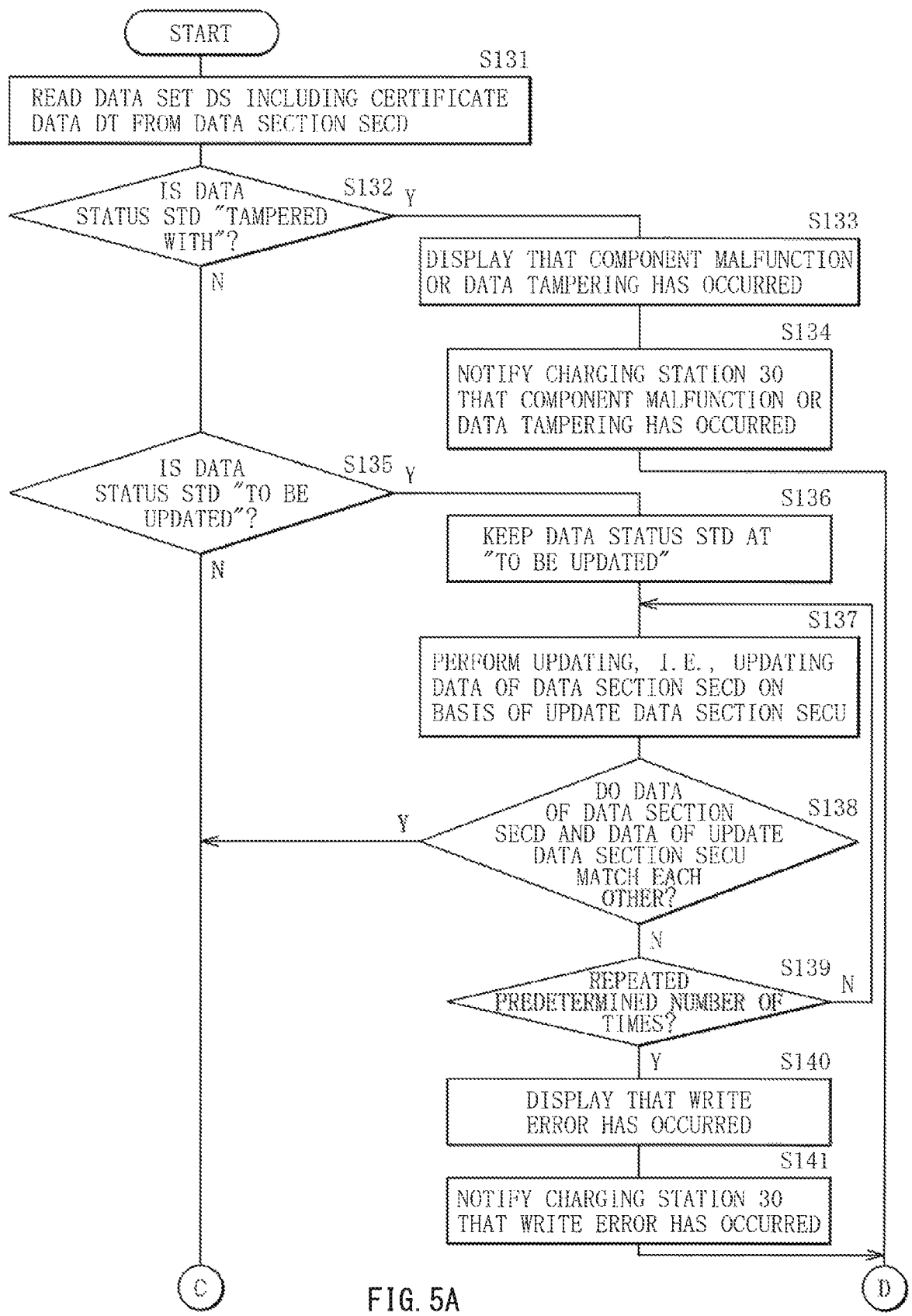
FIG. 5A is another flowchart illustrating an operation example of the vehicle illustrated in FIG. 1.
Figure 5B:
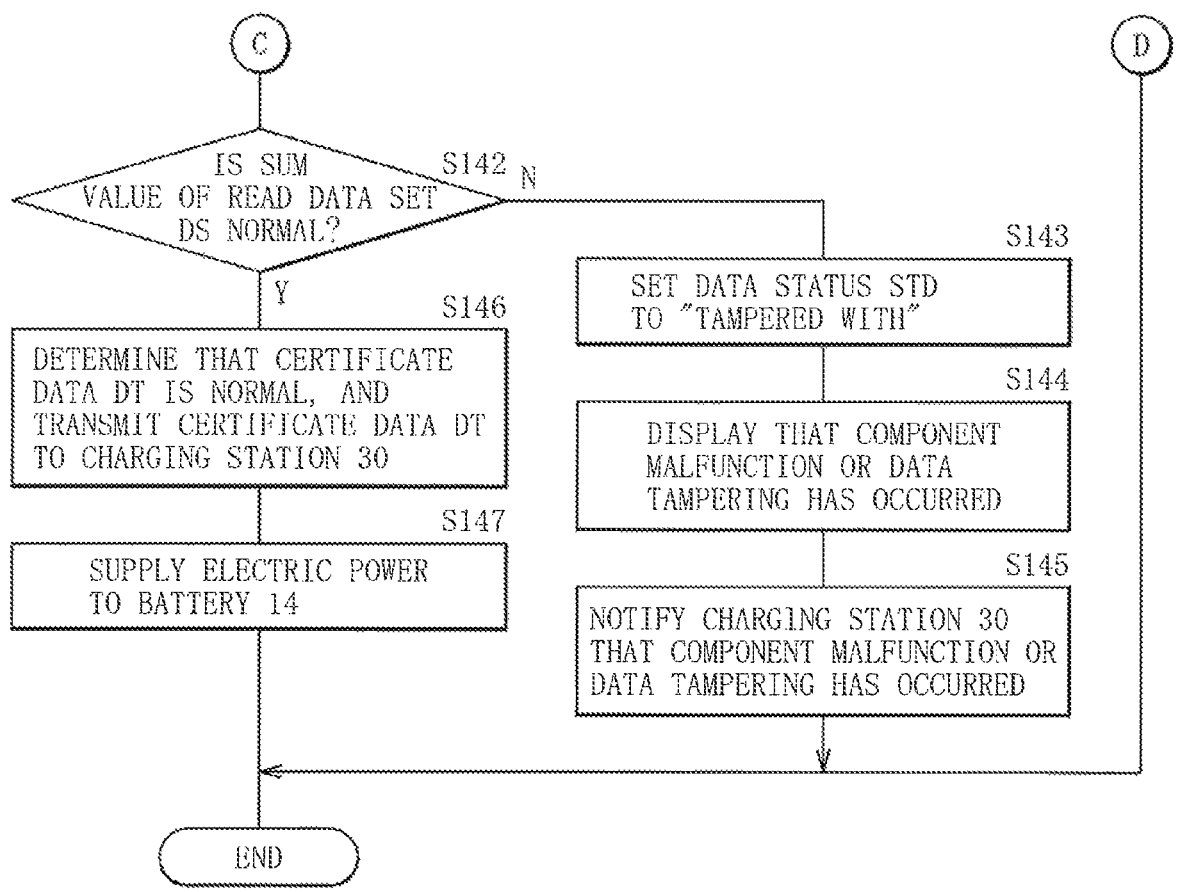
FIG. 5B is another flowchart illustrating an operation example of the vehicle illustrated in FIG. 1.

FIGS. 5A and 5B illustrate operation of the vehicle 10 in charging the battery 14 by using the certificate data DT. The section management unit 22 of the vehicle 10 may read, from the data section SECD, a data set DS including certificate data DT (certificate data DTD), and determine whether the certificate data DT is normal on the basis of the data set DS. In a case where the certificate data DT is normal, the charging station 30 may charge the battery 14 of the vehicle 10. This operation is described in detail below.

First, the section management unit 22 may read a data set DS including certificate data DT (certificate data DTD) from the data section SECD (step S131). In this example, the first data set DS1 may include the certificate data DT. The section management unit 22 may therefore read the first data set DS1.

Thereafter, the section management unit 22 may check whether the data status STD included in the read data set DS is "tampered with" (step S132).

In a case where the data status STD is "tampered with" in step S132 ("Y" in step S132), the monitoring unit 25 may confirm that the data status STD is "tampered with", and the display 13 may display that a component malfunction or data tampering has occurred, on the basis of an instruction from the monitoring unit 25 (step S133).

Thereafter, as in step S106, the communicator 21 may notify the charging station 30 that a component malfunction or data tampering has occurred, on the basis of an instruction from the section management unit 22 (step S134). In this case, the charging station 30 may refrain from supplying electric power to the battery 14 of the vehicle 10.

In a case where the data status STD is not "tampered with" in step S132 ("N" in step S132), the section management unit 22 may check whether the data status STD is "to be updated" (step S135).

In a case where the data status STD is "to be updated" in step S135 ("Y" in step S135), the section management unit 22 may keep the data status STD of the data section SECD at "to be updated" (step S136). Thereafter, the section management unit 22 may perform again the updating, i.e., updating the data of the data section SECD on the basis of the update data section SECU (step S137). Thereafter, the section management unit 22 may check whether the data of the data section SECD and the data of the update data section SECU match each other (step S138). In a case where the data of the data section SECD and the data of the update data section SECU match each other in step S138 ("Y" in step S138), the operation may go to step S142. In a case where the data of the data section SECD and the data of the update data section SECU do not match each other ("N" in step S138), steps S137 and S138 may be repeated a predetermined number of times.

In a case where the number of times of repetition reaches the predetermined number of times ("Y" in step S139), the monitoring unit 25 may confirm that the data status STD is "to be updated", and the display 13 may display that a write error has occurred, on the basis of an instruction from the monitoring unit 25 (step S140).

The communicator 21 may notify the charging station 30 that a write error has occurred, on the basis of an instruction from the section management unit 22 (step S141). In this case, the charging station 30 may refrain from supplying electric power to the battery 14 of the vehicle 10.

In a case where the data status STD is not "to be updated" in step S135 ("N" in step S135), the section management unit 22 may check whether the SUM value of the data set DS read in step S131 is normal (step S142). In this example, the section management unit 22 may calculate a SUM value on the basis of the data status STD, the data number ND, and the certificate data DTD included in the first data set DS1. In a case where the calculated SUM value matches the SUM value included in the data set DS1, the section management unit 22 may determine that the SUM value is normal.

In a case where the SUM value of the data set DS is abnormal in step S142 ("N" in step S142), the section management unit 22 may write a data status STD indicating "tampered with" to the data section SECD, thereby setting the data status STD to "tampered with" (step S143).

The monitoring unit 25 may confirm that the data status STD is "tampered with", and the display 13 may display that a component malfunction or data tampering has occurred, on the basis of an instruction from the monitoring unit 25 (step S144).

The communicator 21 may notify the charging station 30 that a component malfunction or data tampering has occurred, on the basis of an instruction from the section management unit 22 (step S145). In this case, the charging station 30 may refrain from supplying electric power to the battery 14 of the vehicle 10.

In a case where the SUM value of the data set DS is normal in step S142 ("Y" in step S142), the section management unit 22 may determine that the certificate data DT (certificate data DTD) included in the data set DS is normal, and the communicator 21 may transmit the certificate data DT to the charging station 30 (step S146).

The authentication unit 31 of the charging station 30 may perform authentication on the basis of the certificate data DT transmitted from the vehicle 10. In a case where the authentication succeeds, the power feed unit 32 may supply electric power to the battery 14 of the vehicle 10. In this manner, electric power may be supplied to the battery 14 of the vehicle 10 (step S147).

(Data Verification Operation in Vehicle 10)

Each time the vehicle 10 starts up, for example, the monitoring unit 25 of the security controller 20 may check whether the write process performed by the security controller 20 has been interrupted, on the basis of the update status STU and the data status STD stored in the storage 23. In a case where the write process has been interrupted, the monitoring unit 25 may check at which stage the interruption has occurred, and determine whether a component malfunction or data tampering has occurred or a data write error has occurred. The determination may be made on the basis of a result of the check, and the certificate data DTU and the certificate data DTD stored in the storage 23. The following description describes, in order, data verification based on the data of the update data section SECU, and data verification based on the data of the data section SECD.

FIGS. 6A and 6B illustrate an example of data verification operation performed by the monitoring unit 25 on the basis of the data of the update data section SECU. In FIG. 6, "without data error" indicates that the SUM value is normal, and "with data error" indicates that the SUM value is abnormal.

For example, in a case where the update status STU is "undefined", the monitoring unit 25 may determine that a component malfunction or data tampering has occurred. In other words, in this example, three statuses, i.e., "updating", "being rewritten", and "unassigned", may be defined to be able to be set as the update status STU. Therefore, the update status STU being none of the three statuses means that the update status STU itself has changed. Accordingly, the monitoring unit 25 may determine that a component malfunction or data tampering has occurred.

In this case, the section management unit 22 may set the data status STD to "tampered with", thereby locking the vehicle 10. The display 13 may display that a component malfunction or data tampering has occurred, on the basis of an instruction from the monitoring unit 25. In the locked state, the vehicle 10 may be unable to delete the data of the update data section SECU or re-update the certificate data DT by communicating with the charging station 30. The charging station 30 may be unable to unlock the vehicle 10, and only the management apparatus 40 may be able to unlock the vehicle 10. In such a case, the driver (user) of the vehicle 10 may bring the vehicle 10 to a dealer. In a case of a component malfunction, the dealer may replace the component. In addition, the management apparatus 40 may communicate with the vehicle 10 to update the certificate data DT stored in the vehicle 10 and reset the data status STD. In a case of data tampering, the management apparatus 40 may communicate with the vehicle 10 to update the certificate data DT stored in the vehicle 10 and reset the data status STD. Thus forcibly writing certificate data DT to the vehicle 10 enables the management apparatus 40 to unlock the vehicle 10.

For example, in a case where the update status STU is "being rewritten" and the certificate data DTU includes a data error, the monitoring unit 25 may determine that a write error has occurred, during data writing to the update data section SECU.

In this case, the section management unit 22 may set the data status STD to "to be updated". The display 13 may display that a write error has occurred, on the basis of an instruction from the monitoring unit 25. In other words, in this case, the write process has been interrupted at a stage where writing of certificate data DT to the update data section SECU has not been completed. It is therefore unlikely that the certificate data DT has been tampered with, for example. Accordingly, the section management unit 22 may refrain from locking the vehicle 10. In such a case, the section management unit 22 may be able to delete the data of the update data section SECU or re-update the certificate data DT by communication with the charging station 30.

For example, in a case where the update status STU is "updating" and the certificate data DTU includes a data error, the monitoring unit 25 may determine that a component malfunction or data tampering has occurred. In other words, in this case, the write process has been interrupted after the writing of certificate data DT to the update data section SECU has been completed. This means that there is a possibility that the certificate data DTU has been tampered with, for example. Accordingly, the monitoring unit 25 may determine that a component malfunction or data tampering has occurred.

In this case, the section management unit 22 may set the data status STD to "tampered with", thereby locking the vehicle 10. The display 13 may display that a component malfunction or data tampering has occurred, on the basis of an instruction from the monitoring unit 25. In the locked state, the vehicle 10 may be unable to delete the data of the update data section SECU or re-update the certificate data DT by communicating with the charging station 30. The charging station 30 may be unable to unlock the vehicle 10, and only the management apparatus 40 may be able to unlock the vehicle 10.

For example, in a case where the update status STU is "unassigned" and the certificate data DTU includes a data error, the monitoring unit 25 may determine that there is no problem. In other words, the update status STU being "unassigned" means that the data error in the certificate data DTU has occurred after the update of the certificate data DT. Accordingly, the monitoring unit 25 may determine that there is no problem.

In this case, the section management unit 22 may be able to delete the certificate data DTU stored in the update data section SECU. The section management unit 22 may also be able to, for example, re-update the certificate data DT by communication with the charging station 30.

For example, in a case where the update status STU is "being rewritten" and the certificate data DTU includes no data error, the monitoring unit 25 may determine that a write error has occurred, during data writing to the update data section SECU.

In this case, the section management unit 22 may set the data status STD to "to be updated". The display 13 may display that a write error has occurred, on the basis of an instruction from the monitoring unit 25. In other words, in this case, the write process has been interrupted at a stage where writing of certificate data DT to the update data section SECU has not been completed. It is therefore unlikely that the certificate data DT has been tampered with, for example. Accordingly, the section management unit 22 may refrain from locking the vehicle 10. In such a case, the section management unit 22 may be able to delete the data of the update data section SECU or re-update the certificate data DT by communication with the charging station 30.

For example, in a case where the update status STU is "updating" and the certificate data DTU includes no data error, the monitoring unit 25 may determine that a write error has occurred in updating the data of the data section SECD on the basis of the update data section SECU.

In this case, because the certificate data DTU of the update data section SECU includes no data error, the section management unit 22 may perform updating, i.e., updating the data of the data section SECD on the basis of the update data section SECU. Consequently, the certificate data DT may be normally written to the data section SECD, and the update status STU may be set to "unassigned"; thus, the update of the certificate data DT may be completed normally.

For example, in a case where the update status STU is "unassigned" and the certificate data DTU includes no data error, the update of the certificate data DT has been completed normally. Accordingly, the monitoring unit 25 may determine that there is no problem.

In this case, the section management unit 22 may be able to, for example, delete the certificate data DTU stored in the update data section SECU.

FIGS. 7A and 7B illustrate an example of data verification operation performed by the monitoring unit 25 on the basis of the data of the data section SECD.

For example, in a case where the data status STD is "normal" and the certificate data DTD includes a data error, the monitoring unit 25 may determine that a write error has occurred.

In this case, because the certificate data DTD includes a data error, the section management unit 22 may make the certificate data DTD unavailable. This makes the charging station 30 unable to supply electric power to the battery 14 of the vehicle 10. The display 13 may display that a write error has occurred, on the basis of an instruction from the monitoring unit 25. In a case where the update data section SECU includes no data error, the section management unit 22 is able to perform updating, i.e., updating the data of the data section SECD on the basis of the update data section SECU. This enables the charging station 30 to charge the battery 14 of the vehicle 10.

For example, in a case where the data status STD is "to be updated" and the certificate data DTD includes a data error, the monitoring unit 25 may determine that a write error has occurred in updating the data of the data section SECD on the basis of the update data section SECU.

In this case, the display 13 may display that a write error has occurred. The section management unit 22 may be able to re-update the certificate data DT by communication with the charging station 30. In a case where the certificate data DTU of the update data section SECU includes no data error and the update status STU is "updating", the section management unit 22 may be able to perform updating, i.e., updating the data of the data section SECD on the basis of the update data section SECU.

For example, in a case where the data status STD is "tampered with" and the certificate data DTD includes a data error, the monitoring unit 25 may determine that a component malfunction or data tampering has occurred.

In this case, because the data status STD is already "tampered with", the vehicle 10 is in the locked state. The display 13 may display that a component malfunction or data tampering has occurred, on the basis of an instruction from the monitoring unit 25. In the locked state, the vehicle 10 may be unable to delete the data of the update data section SECU or re-update the certificate data DT by communicating with the charging station 30. The charging station 30 may be unable to unlock the vehicle 10, and only the management apparatus 40 may be able to unlock the vehicle 10.

For example, in a case where the data status STD is "normal" and the certificate data DTD includes no data error, the update of the certificate data DT has been completed normally. Accordingly, the monitoring unit 25 may determine that there is no problem.

In this case, the certificate data DT is available. For example, the charging station 30 is able to supply electric power to the battery 14 of the vehicle 10.

For example, in a case where the data status STD is "to be updated" and the certificate data DTD includes no data error, the monitoring unit 25 may determine that a write error has occurred in updating the data of the data section SECD on the basis of the update data section SECU.

In this case, the display 13 may display that a write error has occurred. The section management unit 22 may be able to re-update the certificate data DT by communication with the charging station 30. In a case where the certificate data DTU of the update data section SECU includes no data error and the update status STU is "updating", the section management unit 22 may be able to perform updating, i.e., updating the data of the data section SECD on the basis of the update data section SECU.

For example, in a case where the data status STD is "tampered with" and the certificate data DTD includes a data error, the monitoring unit 25 may determine that a component malfunction or data tampering has occurred.

In this case, because the data status STD is already "tampered with", the vehicle 10 is in the locked state. The display 13 may display that a component malfunction or data tampering has occurred, on the basis of an instruction from the monitoring unit 25. In the locked state, the vehicle 10 may be unable to delete the data of the update data section SECU or re-update the certificate data DT by communicating with the charging station 30. The charging station 30 may be unable to unlock the vehicle 10, and only the management apparatus 40 may be able to unlock the vehicle 10.

As described above, the security controller 20 is provided with the update data section SECU and the data section SECD. The section management unit 22 causes the update data section SECU to store the update status STU, and the data section SECD to store the data status STD. In a state in which communication is disconnected, such as when the vehicle 10 is activated, the monitoring unit 25 verifies the certificate data DTU and the certificate data DTD on the basis of the update status STU and the data status STD. This enables the monitoring unit 25 to, for example, check interruption of a write process, on the basis of the update status STU and the data status STD. In a case where the write process has been interrupted, it is possible for the monitoring unit 25 to check at which stage the interruption has occurred, and determine whether a component malfunction or data tampering has occurred or a data write error has occurred. The determination may be made on the basis of a result of the check, and the certificate data DTU and the certificate data DTD stored in the storage 23. This enables the security controller 20 to determine whether a component malfunction or data tampering has occurred or a data write error has occurred, without performing communication between the vehicle 10 and an external apparatus. Consequently, it is possible for the security controller 20 to improve reliability of the certificate data DT.

In other words, in one conceivable method, for example, a vehicle communicates with an external apparatus, and verifies certificate data DT by comparing the stored certificate data DT with certificate data DT transmitted from the external apparatus. However in a case where a malicious third party has prepared the external apparatus, for example, it is difficult to accurately verify the certificate data DT.

In contrast, the security controller 20 according to the example embodiment verifies, in a state in which communication is disconnected, the certificate data DTU and the certificate data DTD on the basis of the update status STU and the data status STD. This enables the security controller 20 to, for example, check interruption of a write process, and verify the certificate data DT on the basis of a result of the check, and the certificate data DTU and the certificate data DTD stored in the storage 23. Thus, in the example embodiment, it is possible for the security controller 20 itself of the vehicle 10 to verify the certificate data DT without performing communication between the vehicle 10 and an external apparatus. Consequently, it is possible for the security controller 20 to accurately verify the certificate data DT, which enables reliability of data (the certificate data DT) to be improved.

The security controller 20 may also determine whether a component malfunction or data tampering has occurred or a data write error has occurred. Thus, in a case where a component malfunction or data tampering has occurred, for example, it is possible to receive appropriate treatment, such as component replacement, by bringing the vehicle 10 to a dealer. In a case of a data write error, for example, it is possible to restore a normal state without bringing the vehicle 10 to a dealer. Consequently, it is possible for the security controller 20 to improve convenience of the user.

Example Effects

As described above, in the example embodiment, the update data section and the data section are provided. The update data section stores the update status, and the data section stores the data status. In a state in which communication is disconnected, the certificate data is verified on the basis of the update status and the data status. This makes it possible to improve reliability of the certificate data.

In the example embodiment, it may be determined whether a component malfunction or data tampering has occurred or a data write error has occurred. This makes it possible to improve convenience of the user.

Although some example embodiments of the technology have been described in the foregoing, the technology is by no means limited to the example embodiments. Various changes and modifications may be made to any embodiment without departing from the scope of the technology.

For example, although an example embodiment has been described above in which the technology is applied to the certificate data DT, data to which the technology is applied is not limited to the certificate data DT. Any embodiment of the technology is applicable to various data.

For example, although an example embodiment has been described above in which the technology is applied to the charging system, a use of the technology is not limited to the charging system. Any embodiment of the technology is applicable to uses other than charging.

The example effects described above are merely illustrative and non-limiting. Any embodiment may achieve an effect other than the example effects described above.

The security controller 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the security controller 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the security controller 20 illustrated in FIG. 1.

Although the technology is described hereinabove in terms of example embodiments, it is not limited thereto. It should be appreciated that variations may be made in the described example embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this technology, the use of the terms first, second, etc. do not denote any order or importance, but rather the terms first, second, etc. are used to distinguish one element from another. The term "disposed on/provided on/formed on" and its variants as used herein refer to elements disposed directly in contact with each other or indirectly by having intervening structures therebetween. Moreover, no element or component in this technology is intended to be dedicated to the public regardless of whether the element or component is explicitly recited in the following claims.

The invention claimed is:

1. A data verification apparatus comprising:
   a storage including a first storage and a second storage, the first storage being configured to store first data and first status information, the second storage being configured to store second data and second status information;
   a management unit configured to control a write process and update the first status information and the second status information in response to the write process, the write process being a process of writing the first data to the first storage on a basis of data acquired by communication with an external apparatus, and thereafter writing the second data to the second storage on a basis of the data; and
   a verification unit configured to verify, in a state in which the communication is disconnected, the first data and the second data on a basis of the first status information and the second status information.

2. The data verification apparatus according to claim 1, wherein, in the state in which the communication is disconnected, the verification unit is configured to check whether the write process has been interrupted on a basis of the first status information and the second status information and, on a condition that the write process has been interrupted, check at which stage the interruption has occurred, and verify the first data and the second data on a basis of a check result as to at which stage the interruption has occurred.

3. The data verification apparatus according to claim 2, wherein, in the state in which the communication is disconnected, the verification unit is configured to determine whether data tampering or a write error has occurred for each of the first data and the second data, on a basis of the check result, the first data, and the second data.

4. The data verification apparatus according to claim 3, wherein the management unit is configured to
   set the first status information to a first status before writing the first data to the first storage,
   set the first status information to a second status after writing the first data to the first storage,
   write the second data to the second storage, and
   set the first status information to a third status, on a condition that the second data in the second storage and the first data in the first storage match each other.

5. The data verification apparatus according to claim 4, wherein, in the state in which the communication is disconnected, the verification unit is configured to determine that the write error has occurred on a condition that the first status information is the first status.

6. The data verification apparatus according to claim 4, wherein, in the state in which the communication is disconnected, the verification unit is configured to determine that the data tampering has occurred on a condition that the first status information is the second status and that the first data includes an error.

7. The data verification apparatus according to claim 1, wherein the management unit is configured to
   set the second status information to a fourth status on a condition that the second data already written to the second storage includes an error, before writing the first data to the first storage,
   set the second status information to a fifth status after writing the first data to the first storage,
   write the second data to the second storage, and set the second status information to a sixth status on a condition that the second data in the second storage and the first data in the first storage match each other.

8. The data verification apparatus according to claim 7, wherein
the verification unit is configured to check, in the state in which the communication is disconnected, whether the first data written to the first storage includes an error and whether the second data written to the second storage includes an error, and
the management unit is configured to write the second data to the second storage again on a basis of the first data written to the first storage, on a condition that the second status information is the fifth status, that the second data includes the error, and that the first data includes no error.

9. A data verification apparatus comprising:
a storage including a first storage and a second storage, the first storage being configured to store first data and first status information, the second storage being configured to store second data and second status information; and circuitry configured to
control a write process and update the first status information and the second status information in response to the write process, the write process being a process of writing the first data to the first storage on a basis of data acquired by communication with an external apparatus, and thereafter writing the second data to the second storage on a basis of the data, and
verify, in a state in which the communication is disconnected, the first data and the second data on a basis of the first status information and the second status information.

* * * * *